United States

Brumlik

[11] 3,930,715

[5] Jan. 6, 1976

[54] OPTICAL PLASMA DEVICES

[76] Inventor: George C. Brumlik, 154 Upper Mountain Ave., Montclair, N.J. 07042

[22] Filed: May 24, 1973

[21] Appl. No.: 363,709

[52] U.S. Cl........ 350/160 R; 350/175 GN; 350/180; 350/288
[51] Int. Cl.² ............................................. G02F 1/01
[58] Field of Search ............ 315/111, 116; 176/6, 8; 350/288, 160 R, 175 GN, 180; 343/909

[56] References Cited
UNITED STATES PATENTS

| | | | |
|---|---|---|---|
| 2,085,406 | 6/1937 | Zworykin | 343/909 |
| 3,067,420 | 12/1962 | Jones et al. | 350/175 GN |

*Primary Examiner*—Ronald L. Wibert
*Assistant Examiner*—Paul K. Godwin
*Attorney, Agent, or Firm*—Burgess, Dinklage & Sprung

[57] ABSTRACT

Optical systems constructed of plasma matter.

In particular optical systems such as radiation shields, reflectors, and shaped optical media in the form or function of optical lenses, optical polarizing devices, analogues to gratings and the like.

Also disclosed are non-linear optical devices which function by a gradual, periodic, or abrupt change in optical properties of the optical medium. The said devices are constructed of plasma or other states matter, for example solid matter, semi-solid matter, fluids or combination thereof.

6 Claims, 6 Drawing Figures

OPTICAL PLASMA DEVICES

BACKGROUND

Hitherto optical devices for the work with light and other electromagnetic radiation have been constructed out of solid materials. For example glass, plastics and other organic and inorganic transparent materials have been used to make lenses such as concave, convex, achromatic, composite lenses. The said material have also been employed to make prisms, polarizing prisms, polarizing sheets, optical retarders and the like. Occasionally entrained fluids given shape by the shaping of their transparent containers have been employed. Magnetic and electrostatic focusing devices have been used in electron, proton and ion microscopy. Such devices are using the magnetic or electrostatic field only, and in contrast to optical devices made of plasma are not constructed of a material body.

Metals in solid form or metals plated on substrates have been employed for concave, convex and complex, reflectors, mirrors and optical gratings. All of these optical devices operate well under ambient conditions up to elevated temperatures which the materials of their construction can take without encountering degradation or change in shape or composition. It is the object of this invention to provide optical devices which can operate at extremely high temperatures at which solid optical devices such as those made of plastics, metals, glass or refractory optical materials fail or cannot exist. The chosen material for the optical devices such as those mentioned above is plasma.

SUMMARY

This invention relates to optical devices constructed of plasma matter. Plasma is a material widely represented in the universe and constitutes the building material of the sun and legions of stars; it is a mass composed of highly ionized atoms and free electrons held together by the interaction between the positive and negative charges residing in the said ionized atoms and of electrons. Plasma can be considered to constitute the fourth state of matter and is a material stable up to exceedingly high temperatures such as exist in the sun and the stars. On earth plasma is found in great variety of electric discharges and dielectric breakdowns. These may cause mild effects such as result from electricity discharges due to differences of static electricity produced by rubbing of dissimilar objects; electrical wind; electrical glow discharges; corona discharges; large electrical arcs for example strokes of lightning which occur during weather storms. Plasma is also found in the matter of flames and high frequency and high velocity shock waves. Plasma matter limits light and other radiation. In addition to its own radiative output, plasma matter is able to reflect, refract, absorb and transmit radiation impinging on its body. The plasma body is made of a highly controllable medium that can be given body and desirable optical and other properties as well as shape. A typical means of generation of plasma is by an electric discharge such as an arc which can be struck between two or more electrodes or which can be electrodeless consisting of a current flowing through a closed loop or oscillating between points in space. This electric discharge may be maintained by a direct current, indirect current which may be pulsed unidirectional or alternating or any combination of the said currents as well as by absorption of proper electromagnetic radiation and other means.

Combined plasma devices may be used to form a cooperative mechanism. This is especially effective if the acoustic, magnetohydrodynamic, electromagnetic, oscillatory waves are phased in a predetermined manner. Magnetic fields generated by the current(s) of the arc itself or outside magnetic fields can be effectively employed to control the properties of the plasma body as well as its internal and external structure and shape. Electromagnetic radiation can be used to cause dielectric breakdown and/or to feed energy to the plasma body and maintain or increase the temperature of the plasma as well as to impart other desirable properties to the plasma. The plasma body can be shaped by means of the number, relative position and the geometry of the electrodes. The geometry of the plasma can further be shaped by secondary arcs surrounding or interacting with the primary arc. Electric arcs are characterized by very large currents and low voltages — a property which is enhanced by high mass density and high temperatures of the arc. The large currents in turn produce intense magnetic fields which profoundly effect the properties and shape of the plasma body. Such magnetic fields may be relatively uniform or of many desired shapes depending on experimental conditions. The plasma geometry can further be influenced by introducing electromagnetic waves into the plasma body. Such electromagnetic waves can be made to interfere with one another to produce either standing waves or drifting waves of desired patterns. The plasma body can be thus made to change gradually in properties from place to place, to exhibit a slow or fast uniform change, a periodicity, an insularity, to form streamers, edies, flows, etc. Said phenomena can be static or be dynamically controlled. The density and other properties of the plasma can further be modified by introducing selectively chosen ionic carriers at the electrodes or at a desired point of the plasma body. Static or dynamic electric fields can be brought to operate on the plasma body by means of suitably positioned electrodes which may be made of conventional materials or preferably of secondary plasma electrodes which operate on the primary plasma body. The above mentioned optical systems are valuable for the concentration of radiation, for shielding, for containment and for control of high temperature plasmas, for example, such as are required for nuclear fusion reactions.

At very high temperatures in the range of $10^{6 \circ}K$ and higher a large amount of radiation is emitted from the plasma by the "Brehmsstralung" effect, an emission of radiation due to the slowing down of very fast electrons and other charged particles in the process of collision. An effective radiation shield for the Brehmsstralung radiation as well as other radiation is composed of a dense cloud of small suspended solid particles in a fluid. Such a suspension of solid particles which resembles physically a smoke cloud which can be dark or luminous depending on its temperature, can be produced by (1) introducing very fine particles of refractory material into the shielding fluid. Such particles can have for example the following composition:

$TiS_2$, $TiC$, $HfC$, $C$, $BN$, $SiO_2$, $MgO$, $Al_2O_3$, $ThO_2$, etc. The second method is to introduce a volatile substance which produces a precipitation of fine particles in suspension caused by the conditions prevailing in the fluid shield medium. High temperatures or a high electromagnetic radiation density effects such precipitation.

For example, hydrocarbons with high C to H ratio such as aromatic hydrocarbons, benzene, naphtalene as well as other unsaturated hydrocarbons, etc. decompose to procue dense "carbon smokes" at high temperatures. Silicones breakdown at high temperatures to produce $SiO_2$ in fluid suspension particularly in the presence of oxygen, etc. The devices of the invention can be used as optical components for optical devices for the concentration, focusing dispersion, reflection or refraction, polarization of electromagnetic radiation. Such plasma components being able to operate at elevated and extreme temperature. The devices of this invention can be used as reflectors and shield for containment and concentration of heat so as to contain and conserve high and ultra high temperatures in selected regions of space. Such reflectors or shields are needed for example in controlled thermonuclear fusion reactions.

DESCRIPTION

Figure 1:
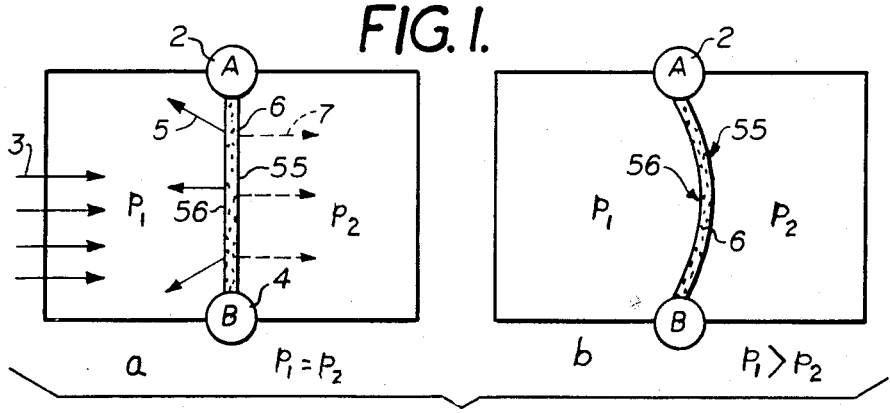
FIGS. 1a and 1b are diagrammatic cross-sectional side views of a suitable plasma generating apparatus.

Referring to FIG. 1a of the drawing, a sheet of plasma 6 is produced by an electrical discharge extended between two parallel elongated electrodes A and B (shown in cross sectional representation). This sheet of plasma is flat when the partial pressure $p_1$ and $p_2$ are the same on both sides of the plasma sheet 6 and no significant force is exerted on the said plasma sheet 6 in a transverse direction to it.

The radiation 3 approaching the plasma body or sheet 6 in a transverse direction is partially reflected (arrows 5) and is partially transmitted (arrows 7). The quantity of the radiation that is not permitted to pass through the plasma body 6 is greatly enhanced over the transmitted radiation on addition of fine particles of a condensed phase into the plasma body 6. The plasma body 6 containing fine particles in suspension acts as an effective radiation shield and radiation reflector.

Figure 2:
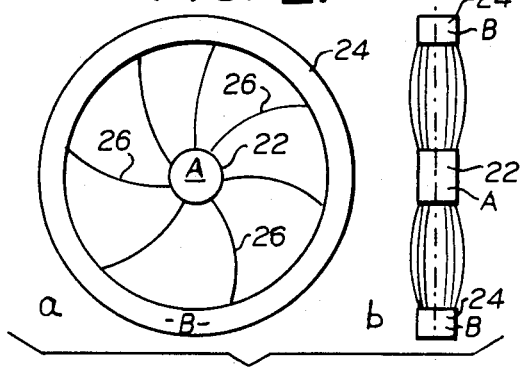
FIG. 2a is a front view and FIG. 2b is a cross sectional side view diagrammatically illustrating further apparatus for generating plasma.

A circular arc is used in FIG. 2. An arc is produced between a center electrode 22 and an annular electrode 24 as shown from the front in FIG. 2a and in cross section in FIG. 2b. The physical properties of the annular arc 26 vary from point to point since the dimensions of the effective arc on electrode 22 is smaller than the ring electrode 24 thus causing transmitted radiation to be diffracted non-linearly.

Figure 3:
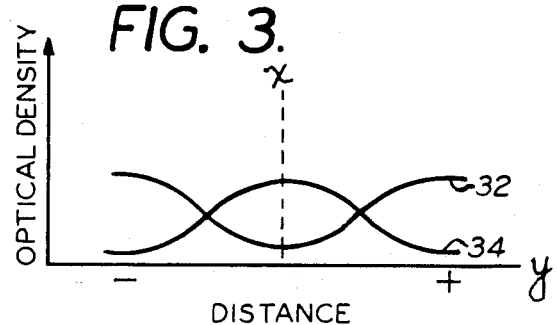
FIG. 3 is a graph charting optical density against distance.
Figure 5:
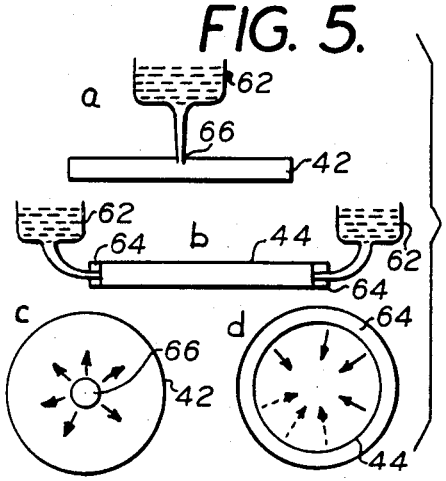
FIGS. 5a – d illustrate a diffusion technique for making lenses according to the invention.
Figure 4:
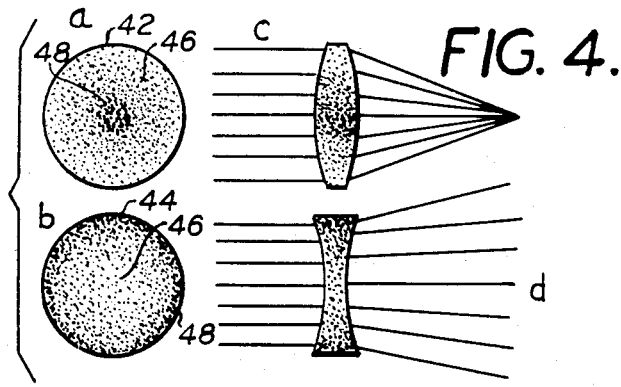
FIG. 4a and 4b are front views and FIGS. 4c and 4d are side cross sectional views of material lenses according to the invention.

The plasma body, therefore acts as a non-linear density lens as shown in terms of the optical density variations with the distance in FIG. 3 and is comparable to a material lens the structure of which is shown in FIGS. 4a, b, c and d. The material lens shown in FIG. 3 are obtained by introducing into a slightly gelled polymer a fluid with a much higher optical density first at the center to obtain a lens of FIG. 4a, by letting the high optical density fluid diffuse outwardly into the disc (FIGS. 5a and 5c) so as to set up a high optical density center which slowly diminishes towards the walls. The polymerization is then completed and the gradient is permanently set. The fluid possessing a high optical density is either unpolymerized with the polymer or is chosen such that it does not migrate after polymerization. To obtain a non-linear optical lens as shown in FIGS. 3b and 3d, the high density material is let to diffuse from the periphery of the lens toward the center (FIGS. 5b and 5d) and the so obtained gradient is permanently set by solidification of the lens. The discs are shown shaped as lenses, but may actually be flat and yet have desirable non-linear refraction characteristics.

Figure 6:
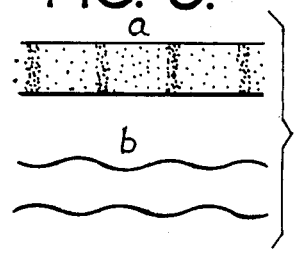
FIGS. 6a – b are diagrammatical views illustrating wave patterns within the body of a plasma sheet.

FIG. 6a demonstrates a wave pattern within the body of a plasma sheet in cross-section shown as a periodic change of the plasma density or properties by means of dots. This wave pattern produces optical phenomena analogous to an optical grating and can be used for example, as an element of an optical monochromater. Static or dynamic wave patterns including standing waves, drifting standing waves, or other predetermined and programmed wave patterns are obtained for example, through the utilization of couplings between the electrons and the ions in the plasma body which are due to their mutual collisions and due to the formation of patterns of micro- and macroscopic electromagnetic fields within the plasma body. The above-mentioned wave patterns impressed on the plasma body can be produced for example, by force fields and combination wave phenomena mentioned above. When a plasma sheet is placed in a magnetic field it takes the properties of an optical polarizing device. It should be appreciated that a plain plasma sheet submersed in a magnetic field functions as an optical device either by itself or in combination with the superimposed wave pattern, The magnetic field used may be uniform or otherwise structured.

FIG. 6b illustrates a wave pattern on the surface sheaths of the plasma sheet.

The concept sheet may be used to cover an extended surface of an arc for example, having a general shape. Such plasma sheets act as a grating capable of diffracting waves both electromagnetic or particular. An arc in the form of a sheet of predetermined geometry struck between two elongated electrodes supports a standing or processing wave pattern both on the surface and within its body. Such a pattern can be produced by sound or ultrasound aa well as by electromagnetic frequency.

Predetermined and programmed steady and varied electric fields, magnetic fields, centrifugal force, electromagnetic fields, equal or structured pressure forces of the surrounding medium, acoustical waves, thermal, magnetohydrodynamic, electromagnetic waves, all profoundly effect the properties of the plasma and their use is within the spirit and scope of the invention.

What is claimed is:

1. An optical reflector comprising a body of plasma matter in an electrical discharge field, wherein said plasma matter contains fine particles of refractory material in suspension.

2. Optical reflector of claim 1 wherein the shape of said reflector is determined by the shape of the electrical discharge field and the partial pressures within said plasma matter.

3. Optical reflector of claim 1 wherein said fine particles of refractory material are selected from the group of C, Bn, $SiO_2$, MgO, $Al_2O_3$ and $ThO_2$.

4. A radiation shield according to claim 1.

5. Optical reflector of claim 1 wherein the plasma matter has a wave pattern superimposed on it.

6. Optical reflector of claim 1 wherein the plasma matter is immersed in a magnetic field.

* * * * *